3,192,283
RECOVERY OF HALOGENATED CARBOXYLIC ACID CATALYST
Robert B. Mosely, Walnut Creek, Calif., and George Holzman, Godfrey, Ill., assignors to Shell Oil Company, New York, N.Y., a corporation of Delaware
Filed Mar. 22, 1963, Ser. No. 267,290
4 Claims. (Cl. 260—683.47)

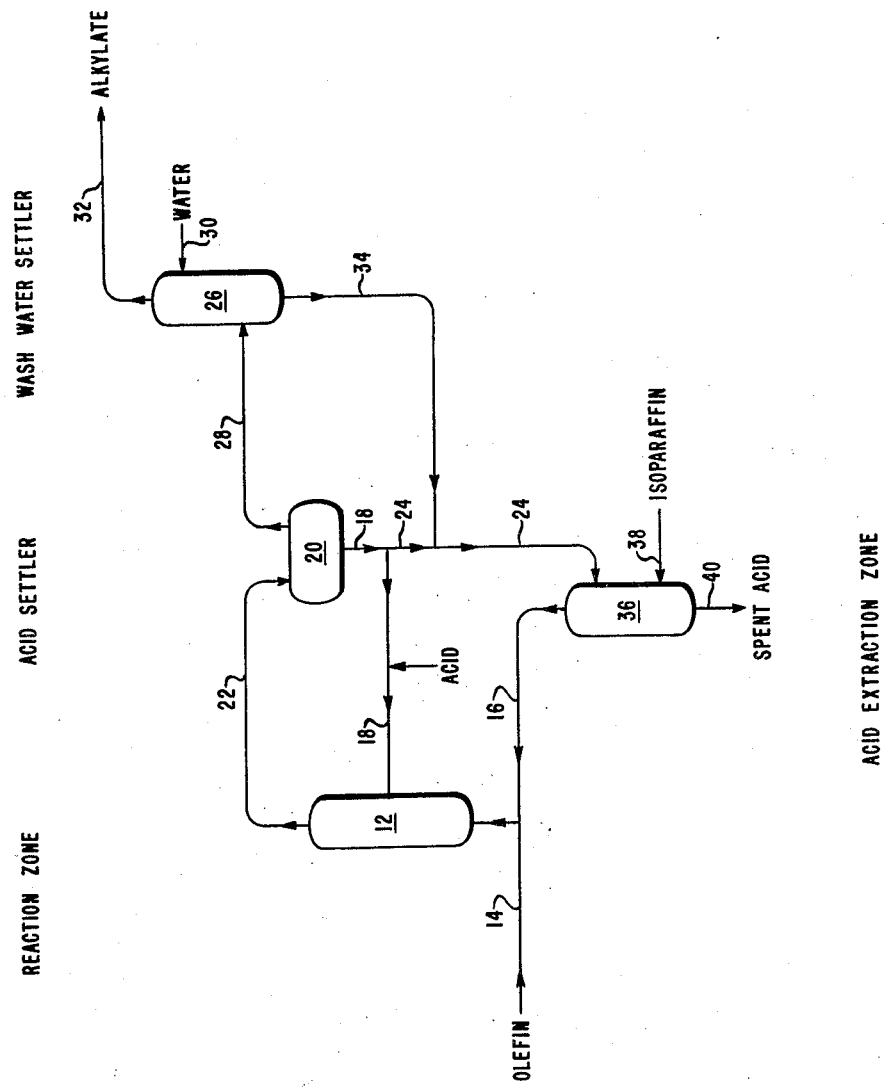

This invention relates to a process for the conversion of hydrocarbons in the presence of an acid catalyst system comprising a mixture of concentrated sulfuric acid and halogen-substituted monocarboxylic acid.

It is well known to prepare high-octane gasoline components by alkylating isoparaffins with olefins in the presence of mineral acids such as concentrated sulfuric acid at low temperatures of about 0° C. to about 30° C. Concentrated sulfuric acid is known to be one of the most practical and effective catalysts for this reaction. And the acid is known to give good yields when it is maintained relatively pure. However, certain undesirable side reactions take place which reduce yield and quality of the alkylate product and often tend to foul the catalyst. Therefore, ways of controlling the reaction are of practical importance.

One of the ways to suppress undesirable side reactions (such as polymerization, cracking and the like) that has been proposed is the addition of a halogen-substituted monocarboxylic acid such as perchlorocarboxylic acid and perfluorocarboxylic acid to the sulfuric acid. The substituted monocarboxylic acid is an effective promotor for the alkylation reaction but the substituted monocarboxylic acid is expensive and has been difficult to recover from spent alkylation acid rejected from the process.

In accordance with the present invention, halogen-substituted monocarboxylic acid is recovered from spent sulfuric acid by contacting the spent acid with a liquid hydrocarbon. In a preferred embodiment of the invention, alkylate product is washed with a small amount of water to recover substituted monocarboxylic acid from the hydrocarbon product and the resultant water/substituted monocarboxylic acid phase is added to the spent acid prior to contacting with hydrocarbon. Separate facilities for the recovery of halogen-substituted monocarboxylic acid from the waterwash stream are eliminated and distribution of the substituted acid between the sulfuric acid and the contacting hydrocarbon is improved. These and further advantages of the invention will be apparent to those skilled in the art from the following detailed description made with reference to the drawing which is a flow diagram showing a preferred embodiment of the process of the invention.

Distribution of halogen-substituted monocarboxylic acid between hydrocarbon and sulfuric acid has been found to be such that more substituted carboxylic acid is present in a saturated-hydrocarbon phase than would be expected, especially in view of the complexes formed between sulfuric acid and the substituted acid. Therefore, in the practice of the invention, spent catalyst containing halogen-substituted monocarboxylic acid is extracted wth hydrocarbon feed. The isoparaffin feed fraction in an alkylation process is a particularly suitable material. After contact, the hydrocarbon fraction, enriched in halogen-substituted monocarboxylic acid, is routed to the conversion process.

It has also been found that the recovery of the halogen-substituted monocarboxylic acid by extraction with hydrocarbon is facilitated by the addition of water. For example, the activity coefficient of trifluoroacetic acid in water is much smaller than in sulfuric acid. However, the addition of small amounts of water, e.g., from about 5% to about 40% w. basis sulfuric acid, preferably from about 5 to about 30% w. basis sulfuric acid, to sulfuric acid-trifluoroacetic acid mixture increases the activity coefficient of trifluoroacetic acid. That is, trifluoroacetic acid is more easily extracted from a sulfuric acid-water mixture by hydrocarbon than from either water or 100% sulfuric acid.

The halogen-substituted monocarboxylic acid used in the present process should be strongly acidic. This is desirable to avoid diluting the sulfuric acid catalyst excessively, since with diminution of acid strength, yields tend to be adversely affected. Suitably strong acids are those wherein the alkyl hydrogens of the monocarboxylic acid have been completely substituted with the more active halogens, i.e., halogens having an atomic weight less than 40, such as fluorine and chlorine. Desirable monocarboxylic acids have from 2 to about 7 carbon atoms, preferably from about 2 to about 5 carbon atoms. Examples of such perchloro- and perfluorocarboxylic acids are trichloroacetic acid, pentafluoropropionic acid, heptafluorobutyric acid, etc.; trifluoroacetic acid is particularly suitable for the present process.

Of course it will be recognized that the halogen-substituted monocarboxylic acid catalyst system is applicable to many other hydrocarbon conversion processes, such as the hydration of olefins to alcohols.

In order to set forth more fully the nature of the invention, without however intending to limit the scope of the invention, the invention will be described in detail as applied to the alkylation of olefin with isoparaffin in a sulfuric acid-trifluoroacetic acid catalyst system.

The alkylation reaction can be carried out in any suitable form of apparatus and with a variety of isoparaffins and olefins, such as are capable of entering into low temperature alkylation reaction e.g., isobutane with butylene, propylene, amylene, polymers of butylene or propylene. As in the usual procedure, the molar ratio of isoparaffin to olefin is at least 1:1, and preferably higher, and the titratable acidity of the catalyst in the reaction mixture is maintained above 85%, and preferably from about 90% to about 98%. The pressure is suitably maintained to carry out the reaction in the liquid phase.

The beneficial effects of the halogen-substituted monocarboxylic acid is obtained over a wide range of concentrations. However, from an economic point of view, it is preferred that the concentration of the halogen-substituted monocarboxylic acid be from about 2% to about 75% by weight, based on total acid mixture, preferably from about 5% to about 50% by weight.

Referring now to the drawing: auxiliary equipment such as pumps, compressors, heat exchangers, control mechanisms, valves, etc., which are obvious to those skilled in the art are not shown. A hydrocarbon fraction containing olefins having from 3 to 5 carbon atoms is introduced into reaction zone 12 via line 14 together with isobutane from line 16. The isobutane concentration in the hydrocarbon phase is approximately 40% by weight. The acid catalyst (60% w. concentrated sulfuric acid–40% w. trifluoroacetic acid) is introduced into reaction zone 12 via line 18. The temperature in the reaction zone is about 0° C.

Reactor effluent containing dissolved and entrained catalyst and alkylation product hydrocarbon, generally referred to as alkylate, enters acid settler 20 through line 22. Settled acid is withdrawn and recycled to reaction system 12 via line 18. Spent acid is rejected from the system as necessary through line 24. Fresh acid is added to maintain acidity and to replace rejected and lost acid.

Alkylate substantially reduced in catalyst content is withdrawn from acid settler 20 and routed to water-wash settler 26 via line 28. Water is introduced into settler 26 through line 30. The water washing is carried out in multiple contacting stages. (Of course, a single stage can be used, but it is less efficient than multiple stages.) Alkylate is withdrawn from the settler via line 32 and is desirably given a caustic wash to neutralize any entrained acid. Water containing acid is withdrawn from settler 26 via line 34.

The rejected spent acid, containing trifluoroacetic acid, is passed into acid extraction zone 36 wherein it is contacted with the total isoparaffin fraction introduced into the zone through line 38. Of course, only a portion of the isoparaffin, for example from about 50% to about 95% by volume, preferably from about 70% to 95% by volume, of the total isoparaffin fraction (recycle isoparaffin plus fresh isoparaffin) can be introduced into the extraction zone. (While it is possible to use the olefin-containing hydrocarbon fraction, it is preferred to use the isoparaffin fraction to avoid the possibility of forming esters. Also, while it is possible to use other light hydrocarbon fractions, e.g. hydrocarbon fractions boiling up to about 400° F., it is preferred to use a hydrocarbon fraction that is used in the conversion process.) The extraction can be carried out with or without contact means such as packing, trays, and the like. While it is not necessary in the practice of the invention, it is preferred to employ countercurrent extraction techniques in order to realize maximum benefits of the invention. The extraction can be carried out in multiple extraction stages. (Naturally the extraction can be carried out less efficiently in a single stage.) The temperature in the extraction zone generally varies from the alkylation temperature to ambient temperature, e.g. from about 0° C. to about 50° C. Spent catalyst substantially reduced in trifluoroacetic acid content is withdrawn from the extraction zone via line 40. Isoparaffin enriched in trifluoroacetic acid is withdrawn from the extraction zone and is routed to reaction zone 12 via line 16.

In a preferred embodiment of the invention, a small amount of water is added to the spent acid to improve extraction efficiency. A particularly attractive manner of adding water to the acid is to use the amount of water that is to be added to the spent acid to wash the alkylate in water-wash settler 26. In this manner, the water recovers entrained and dissolved trifluoroacetic acid from the hydrocarbon product. The water enriched in trifluoroacetic acid is added via line 34, to the spent acid in line 24 prior to extraction with isoparaffin in acid extraction zone 36. The isoparaffin then more efficiently extracts the trifluoroacetic acid from both the spent sulfuric acid and from the wash water. Thus, separate facilities for the recovery of trifluoroacetic acid from the water-wash stream are eliminated and the extraction of trifluoroacetic acid and by hydrocarbon from the spent sulfuric acid is improved.

The following examples are illustrative of some of the advantages derived from the invention, but are not to be considered to limit the scope of the invention.

*Example I*

A hydrocarbon fraction containing $C_3$ and $C_4$ olefins is alkylated with isobutane in the presence of a sulfuric acid-trifluoroacetic acid catalyst system wherein trifluoroacetic acid comprises 40% w. of the total acid. The acid-to-hydrocarbon ratio is 1 v./v. The amount of trifluoroacetic acid lost in the alkylate is 0.2 barrel trifluoroacetic acid per barrel net crude alkylate, and the amount of trifluoroacetic acid lost in the rejected, spent acid is 0.012 barrel trifluoroacetic acid per barrel net crude alkylate. This is a total loss of 0.212 barrel trifluoroacetic acid per barrel net crude alkylate.

*Example II*

The alkylate fraction from Example I (which also contains isobutane) is contacted with an amount of water equal to 20% w. of spent acid in a three-stage wash tower. The rejected, spent acid from Example I is contacted with all of the isobutane in a one-stage extraction zone. The amount of trifluoroacetic acid recovered by washing the alkylate is about 0.2 barrel trifluoroacetic acid per barrel net crude alkylate and the amount of trifluoroacetic acid recovered from the rejected, spent acid is 0.01 barrel trifluoroacetic acid while this is a total recovery of more than 99% of the trifluoroacetic acid, the recovery facilities include a fractionation tower to recover trifluoroacetic acid from water.

*Example III*

The water/trifluoroacetic acid phase, recovered from washing the alkylate with water, is added to the rejected, spent acid prior to contacting with isobutane. The extraction of trifluoroacetic acid, with isobutane, from the rejected, spent acid is carried out in a two-stage extraction zone. The addition of water improves extraction so that essentially all of the trifluoroacetic acid is recovered from the rejected, spent acid. And it is not necessary to install a fractionation tower with concomitant auxiliary equipment to recover the trifluoroacetic acid from the water.

We claim as our invention:

1. In a process for the conversion of hydrocarbon in the presence of an acid catalyst comprising a mixture of concentrated sulfuric acid and halogen-substituted monocarboxylic acid wherein halogen has an atomic weight less than 40, in which process spent acid containing halogen-substituted monocarboxylic acid having from 2 to about 7 carbon atoms is rejected, the improvement which comprises contacting the rejected acid containing halogen-substituted monocarboxylic acid in an extraction zone with liquid hydrocarbon and withdrawing from the extraction zone reject catalyst substantially reduced in concentration of halogen-substituted monocarboxylic acid and hydrocarbon enriched in halogen-substituted monocarboxylic acid.

2. In a process for alkylating isoparaffin with olefin in the presence of an acid catalyst comprising a mixture of concentrated sulfuric acid and trifluoroacetic acid, in which process hydrocarbon effluent containing trifluoroacetic acid is separated from the acid catalyst and spent acid containing trifluoroacetic acid is rejected from the process, the improvement which comprises washing the hydrocarbon effluent containing trifluoroacetic acid with water to remove the acid, combining at least a portion of the wash water containing trifluoroacetic acid with the rejected spent acid containing trifluoroacetic acid such that the acid contains from about 5% to about 40% w. water, basis sulfuric acid, contacting the combined wash water and rejected acid in an extraction zone with liquid isoparaffin, withdrawing from the extraction zone water and rejected catalyst substantially reduced in concentration of trifluoroacetic acid and isoparaffin enriched in trifluoroacetic acid and alkylating the enriched isoparaffin with olefin under alkylation conditions in the presence of the acid catalyst.

3. The process according to claim 2 wherein the isoparaffin comprises isobutane.

4. In an alkylation process wherein isoparaffin and olefin having from 3 to 5 carbon atoms are fed to a reaction zone containing an acid catalyst comprising a mixture of concentrated sulfuric acid and a perhalogenated monocarboxylic acid having from 2 to about 7 carbon atoms, halogen having an atomic weight less than 40, comprising alkylation product and unreacted feed and acid are removed from the reaction zone, and at least part of the acid is rejected as spent acid, the improvement which comprises contacting the rejected spent acid in an extraction zone with at least a portion of the isoparaffin feed to the reaction zone, thereby extracting useful perhalogenated monocarboxylic acid from the spent acid, withdrawing from the extraction zone rejected spent acid substantially reduced in concentration of perhalogenated monocarboxylic acid and isoparaffin extract enriched in perhalogenated monocarboxylic acid, and alkylating the isoparaffin extract with olefin in the reaction zone.

References Cited by the Examiner
UNITED STATES PATENTS
2,981,772  4/61  Holzman _____ 260—683.63

ALPHONSO D. SULLIVAN, *Primary Examiner.*